United States Patent [19]

Gross

[11] Patent Number: 4,803,040
[45] Date of Patent: Feb. 7, 1989

[54] EXPERT SYSTEM FOR SURVEILLANCE AND DIAGNOSIS OF BREACH FUEL ELEMENTS

[75] Inventor: Kenny C. Gross, Lemont, Ill.

[73] Assignee: The United States of America as represented by the United States Department of Energy, Washington, D.C.

[21] Appl. No.: 146,559

[22] Filed: Jan. 21, 1988

[51] Int. Cl.$^4$ .............................................. G21C 7/36
[52] U.S. Cl. ..................................... 376/216; 376/217; 364/513
[58] Field of Search ........................ 376/215, 216, 217; 364/513

[56] References Cited

U.S. PATENT DOCUMENTS

| | | | | |
|---|---|---|---|---|
| 4,415,524 | 11/1983 | Gross | ................................. | 376/216 |
| 4,459,259 | 7/1984 | Colley | ................................. | 376/216 |
| 4,591,983 | 5/1986 | Bennett | ............................. | 364/403 |
| 4,648,044 | 3/1987 | Hardy | ................................ | 364/513 |
| 4,658,370 | 4/1987 | Erman | ............................... | 364/513 |
| 4,713,775 | 12/1987 | Scott | ................................... | 364/513 |

OTHER PUBLICATIONS

Hayes-Roth, Fredrick; "The Knowledge-Based Expert System: A Tutorial"; Computer, Sep. 1984, pp. 11–28.

Primary Examiner—Donald P. Walsh
Attorney, Agent, or Firm—Gustavo Siller, Jr.; Paul A. Gottlieb; Judson R. Hightower

[57] ABSTRACT

An apparatus and method are disclosed for surveillance and diagnosis of breached fuel elements in a nuclear reactor. A delayed neutron monitoring system provides output signals indicating the delayed neutron activity and age and the equivalent recoil areas of a breached fuel element. Sensors are used to provide outputs indicating the status of each component of the delayed neutron monitoring system. Detectors also generate output signals indicating the reactor power level and the primary coolant flow rate of the reactor. The outputs from the detectors and sensors are interfaced with an artificial intelligence-based knowledge system which implements predetermined logic and generates output signals indicating the operability of the reactor.

15 Claims, 2 Drawing Sheets

EXPERT SYSTEM FOR SURVEILLANCE AND DIAGNOSIS OF BREACH FUEL ELEMENTS

CONTRACTUAL ORIGIN OF THE INVENTION

The U.S. Government has rights to this invention pursuant to Contract No. W-31-109-ENG-38 between the U.S. Department of Energy and the University of Chicago, representing Argonne National Laboratory.

BACKGROUND OF THE INVENTION

This invention pertains to a system for diagnosing the status of a nuclear reactor operating with breached fuel elements and more particularly to a system which diagnoses the status of a nuclear reactor operating with breached fuel elements which utilizes an "expert system".

The fuel in a fission type reactor is typically an isotope of uranium, such as uranium-235. The reactor fuel may take the form of a fluid, such as an aqueous solution of enriched uranium; but typically the fuel is solid, either metallic uranium or a ceramic such as uranium oxide or uranium-plutonium oxide. The solid fuel material is fabricated into various small plates, pellets, pins, etc.; which are usually clustered together and in an assemblage called a fuel element. Almost all solid fuel elements are clad with a protective coating or sheath that prevents direct contact between the fuel material and the reactor coolant. The cladding also serves as part of the structure of the fuel elements.

The operation of fuel elements generates heat, which heat is typically dissipated by means of a coolant passed through the reactor. The coolant can be water, operating as either liquid or steam, or the coolant can be a liquid metal, such as sodium or a sodium-potassium mixture. The coolant passes in proximate contact over the cladded fuel elements; and sound cladding isolates or separates the coolant from the radioactive fuel material. However, in the event of a breach in the cladding, the coolant directly contacts the fuel. The radioactive discharge may then, in turn, be conveyed via the coolant throughout the entire coolant system, thereby contaminating the entire system.

Also given off, as part of the radioactive discharge are isotopes, that not only give off typical gamma rays of radioactivity, but also give off what are known as delayed neutrons. The delayed neutron emitters are soluble in liquid sodium (the coolant) so that they readily blend in with the coolant, should a fuel element cladding breach occur, and flow from the coolant throughout the system.

Therefore, it becomes readily apparent that the event of a fuel cladding breach must be taken into account when designing and operating a nuclear reactor. Not every occurance of a breached fuel element should trigger the automatic or manual shut-down of a nuclear reactor. In some instances, a reactor may be safely operated with breached fuel elements. Presently, liquid-metal cooled nuclear reactors (LMR's) exist which are licensed to operate with failed fuel. This mode of operation is typically referred to in the art as run-beyond-clad-breach (RBCB) operation. The current practice in most countries that have LMR programs is to set conservative shutdown limits on the magnitude of delayed-neutron (DN) signals coming from breached fuel.

It would be advantageous in RBCB operation to significantly relax the conservatism in DN shutdown limits without compromising plant-safety assurance. Significant advantage could be derived from a system which could discriminate between cladding breach events which lead to plant operational degradation which might challenge safety or radiological performance guidelines and those events which do not. Such a system would allow the continued operation of the reactor under a stable breached pin condition, which would significantly improve reactor availability.

A device called an equivalent recoil area (ERA) meter, which is a multiple detector DN monitoring station was previously developed for monitoring DN signals coming from breached fuel in LMR's. This device is disclosed in U.S. Pat. No. 4,415,524 entitled "Apparatus and Method of Monitoring for Breached Fuel Elements", issued to Kenny C. Gross et al., which patent is incorporated herein by reference.

During breached-fuel operation, the ERA meter makes available to the reactor operator quantitative diagnostic information relating to the condition and dynamic evolution of a fuel breach. The diagnostic parameters include a continuous reading of the ERA value for the breach (which is a measure of the relative size of the breach). The ERA meter also provides continuous readings of the sodium transit time, $T_{tr}$, to the detector station and the isotopic hold-up time, $T_h$, a measure of the effective aging of DN precursors between birth in the fuel and their release to the coolant.

Since the time that the ERA meter was originally conceived, it has been discovered that, contrary to earlier beliefs, the age of a DN signal is not constant with time. It has been learned from two recent experiments performed in the EBR-II reactor that the age of the signal can change spontaneously and frequently, even when all other reactor variables are at steady-state. The physical mechanism that initiates the changes in the isotopic hold-up time are still not fully understood. But the implications of a dynamically changing isotopic age are quite unsettling. It makes it virtually impossible for a human reactor operator to interpret and assess the safety significance of a changing DN signal.

The reason for this is that the magnitude of a DN signal is a sensitive function of the age of the signal. Although, the ERA meter will help mitigate confusion and ambiguity by providing the operator with a separate reading of the DN age, the age is only one of several system variables that can cause a DN signal to change. If a signal is increasing, for example, table 1 lists nine possible physical variations that could have caused the signal to increase. Of course, any two or more of these physical variations could be occuring simultaneously. A similar matrix of physical causes also exists which may explain a decreasing DN signal.

TABLE I

Possible Interpretations of an Increasing Delayed-Neutron Signal

1. Increasing local fission rate
2. Increasing breach area
3. Increasing flow past source ⎫ Depends on combination
4. Decreasing flow past source ⎭ of age* and DN concentration in Na
5. Decreasing $T_h$
6. Increasing flow rate in sample line to DND
7. New defect starting elsewhere (different pin or new location in same pin)
8. Change in dilation characteristics (e.g. at inlet scoop of bypass loop, or leakage component at assembly-facility interface)

TABLE I-continued

Possible Interpretations of an Increasing
Delayed-Neutron Signal

9. Drifting DND characteristics (malfunction)

*Total age is a combination of holdup time, $T_h$, and transit time, $T_{tr}$

It would, therefore, not be possible for a human operator to combine readings from the ERA meter with readings from flow, power, temperature, and various electrical sensors and then mentally step through the complex conditional branching hierarchy that is needed to arrive at an unambiguous interpretation of a change in a DN reading.

Currently, full interpretation of these variables requires several days to weeks of detailed analysis by teams of specialists. The time needed for such interpretations is exemplified in well known cases that required several man-weeks of analysis for full interpretation, such as the TOPI-2 experiment, conducted by EBR-II, MST, and the PNC of Japan; breached assembly DE-9 that scrammed the FFTF in August 1984; the P4 experiment conducted by RAS; and the MOL-7C test by the French and Germans. Since a reactor operator must make an immediate decision whether to scram the reactor, continue reactor operation, or manually shutdown the reactor, the lengthy time periods required for the above referenced experiments are unacceptable.

Therefore, in view of the above, it is an object of the present invention to make available a system that provides the reactor operator with a very rapid identification of off-normal RBCB conditions.

It is another object of the present invention to provide an apparatus and method which will allow significant relaxation of the present conservatism in DN shutdown limits without compromising plant-safety assurance.

It is still a further object of the present invention to provide a system which makes available, to a reactor operator, on-line diagnosis and interpretation of a variety of interacting physical variables during exposed fuel operation.

It is yet another object of the present invention to provide a system which makes available, to a reactor operator, information needed to make proper decisions about technical-specification conformance of the reactor during RBCB operation.

Additional objects, advantages and novel features of the invention will be set forth in part in the description which follows, and in part will become apparent to those skilled in the art upon examination of the following or may be learned by practice of the invention. The objects and advantages of the invention may be realized and obtained by means of the instrumentalities and combinations, particularly pointed out in the appended claims.

SUMMARY OF THE INVENTION

To achieve the foregoing and other objects and in accordance with the purposes of the present invention, as embodied and broadly described herein, the present invention provides a method and apparatus for surveillance and diagnosis of breached fuel elements in a nuclear reactor. A delayed neutron monitoring system generates output signals indicating the delayed neutron activity and delayed neutron age from a breached fuel element, and the equivalent recoil area of the breached fuel element. Sensors are used to detect the operability of each of the components of the delayed neutron monitoring system and to generate an output signal indicating the status of each component. Detectors also generate an output signal indicating the reactor power level and the reactor primary flow rate. The output from the detectors and sensors are interfaced with a knowledge system. The knowledge system includes a factual knowledge base and a judgmental knowledge base. The judgmental knowledge base uses predetermined logic, which accounts for the changing delayed neutron age. The knowledge system generates output signals indicating whether the reactor should continue to operate, be manually shutdown, be scrammed, or whether an alarm status should be set.

DETAILED DESCRIPTION OF THE INVENTION

Figure 1:
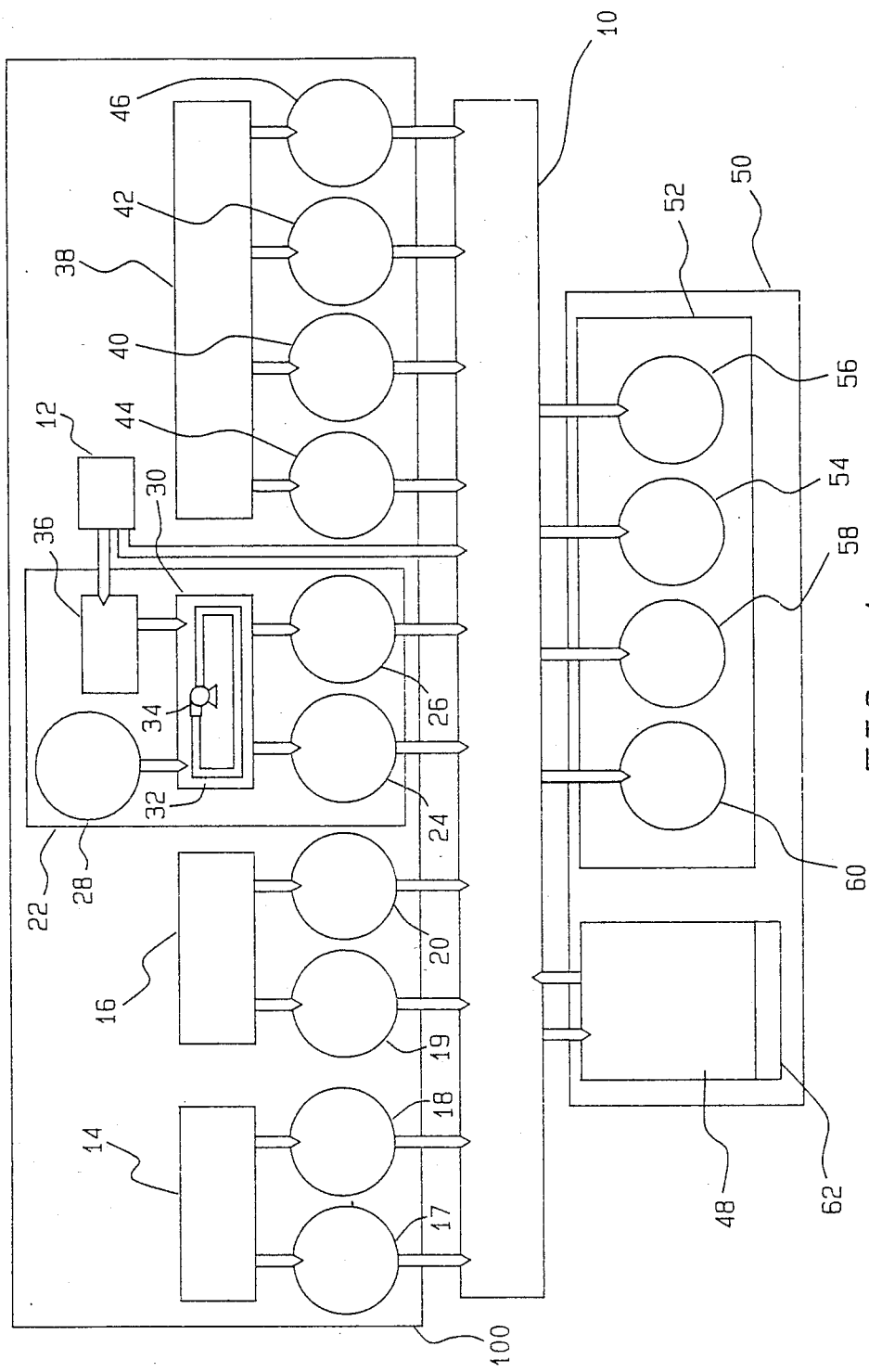
FIG. 1 is a schematic representation of the failed fuel surveillance and diagnostic system of the present invention.
Figure 2:
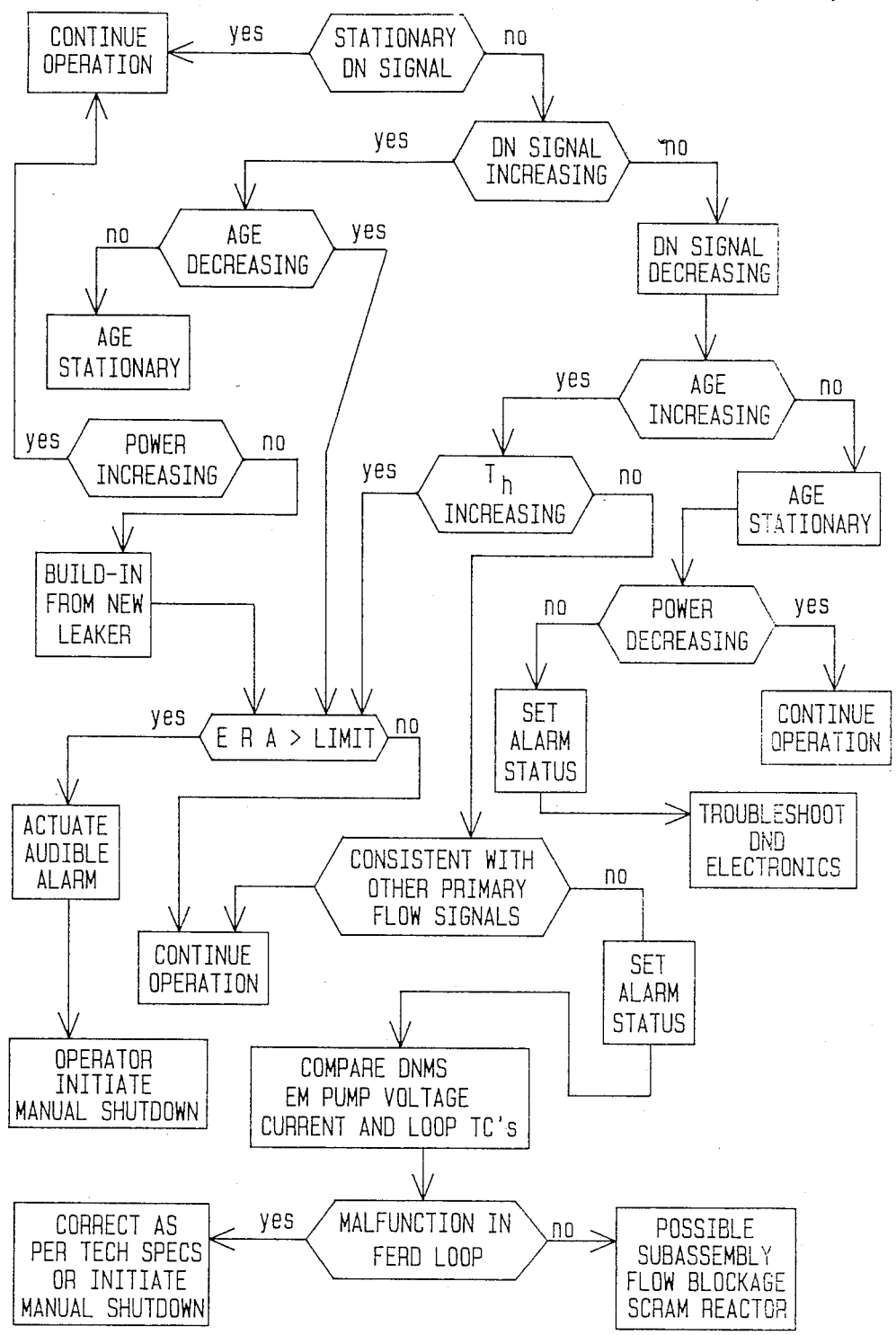
FIG. 2 is a logic diagram and conditional branching structure used in the inference engine of the expert system of the present invention.

Reference will now be made to the present preferred embodiments of the invention, an example of which is illustrated in FIGS. 1 and 2. FIG. 1 illustrates the architecture of the failed fuel surveillance and diagnosis apparatus of the present invention. An artificial intelligence based "inference engine" 10 along with a factual knowledge base 12 comprise a knowledge system which is interfaced to the reactor's data acquisition system and control room instrumentation. The artificial intelligence based inference engine 10 will hereinafter be referred to as a judgmental knowledge base. The judgmental knowledge base, along with the factual knowledge base, comprise a knowledge system which may be used to emulate a reasoning task to interpert encoded knowledge of human experts stored therein.

The reactor parameters which are used as input into the judgmental knowledge base 10 include readings from the primary coolant flow rate with a flow meter 14 and readings of the reactor power with a reactor power level detector 16. Preferably, these readings include two independent readings of the primary coolant flow rate through a first flow channel 17 and a second flow channel 18 and two independent readings of the reactor power through a first power channel 19 and a second power channel 20.

The remaining input parameters originate within the DN monitoring station (DNMS). The DNMS 22 generates output signal 24, indicating the age of the delayed neutrons, and signal 26, indicating the ERA of a breached fuel element, to judgmental knowledge base 10. Preferably, the DNMS 22 is a multiple detector DN monitoring system, as the one disclosed in U.S. Pat. No. 4,415,524 issued to Kenny C. Gross et al. This system includes at least three DN activity detectors 28 and an ERA meter 30. In the prefered embodiment, which utilizes the ERA meter disclosed by the above-referenced patent, the DN age signal 24 and ERA signal 26 are generated by means of the three DN detectors in combination with a loop flow circuit 32 and pump 34. The pump 32 conveys coolant from reactor core through the loop 32 and back into the core. The three DN activity detectors 28 are placed proximate to the loop flow circuit 32. The DN activity detectors generate output signals to computer system 36, which communicates with factual knowledge base 12. The computer system 36 generates the DN age signal 24 and the ERA signal 26 by means of the equations disclosed in the above-reference patent.

Factual knowledge base 12 contains factual data, which is available to the judgmental knowledge base 10 in the decision making process. Factual knowledge base 12 contains data relating to: the radioactive decay constants for the DN emitting fission products; isotopic fission yields; recoil correction factors; probabilities of neutron emmission; known flow delay times between successive DN detectors in the DNMS 22; equations for variations in transit times as a function of coolant flow rate; DN detector efficiencies and calibration factors; and any other relevant nuclear and system data.

An operability validaton system 38 detects any malfunction in the components of DNMS system 22 and interfaces signals indicating a malfunction to the judgmental knowledge base 10.

In the exemplary embodiment wherein the multiple detector DN monitoring system is utilized, detecting system 38 is comprised of a system which detects the flow in flow circuit 32, the status of the pump 34 and the temperature of the flow through the loop 32. The system includes a flow metering device 44 which measures the flow rate through loop 32 and thermocouples 46 which measure the temperature of the flow in the circuit. The system also includes a voltage meter 40 and a current meter 42 which measure the voltage and current of pump 34 respectively. Although the apparatus of the present invention has been described with reference to a multiple detector DN monitoring system, it will b readily apparent to those skilled in the art that other systems which measure the ERA may also be used along with the appropriate operatibilty validation system.

The judgmental knowledge base 10 receives, as inputs, signals indicating the primary flow rate, the reactor power level, the delayed neutron age, the ERA, and the signals indicating the operability of the components in the DNMS from operability validation detector 38. Judgmental knowledge base 10 then implements an operability logic algorithm, which is illustrated in FIG. 2. Output from the judgmental knowledge base 10 is integrated with a display monitor 48 in control room 50 and then multiplexed back to data acquisition system 100 for archive backup storage.

During operation with a breached element that gives a DN signal, the total age (i.e. sum of $T_{tr}$ and $T_h$) that is output from the ERA meter 30 will be continuously monitored. If the age is increasing, a check will first be made to determine if $T_h$ is increasing. If so, the ERA value will be compared against a predetermined shutdown limit. That limit will replace the current administrative limit on DN-signal magnitude, and is expected to be far more conservative in limiting events that might challenge safety or radiological performance guidelines, while minimizing the possibilities of unnecessary reactor trips caused by events having no safety significance. If the computed ERA value exceeds the limit, an audible alarm 54 will be sounded and the operator will initiate a manual shutdown of the reactor.

If $T_h$ is not increasing, then the sodium transport time is increasing. In this event, a check is first made with the two independent primary flow sigaals from flow channels 17 and 18. If it is determined that the flow through the core is not being changed, an alarm status is set and the check is made for a malfunction affecting flow control within the DNMS loop 22 itself. Signals employed for this comparison are the DNMS electromagnetic pump voltage and current from voltage meter 40 and current meter 42 respectively, the DNMS flow from flow meter 44 and the loop flow temperature from thermocouples 46. If it is determined that the indicated change in the $T_{tr}$ is attributed to a malfuction in the DNMS loop 22, then an attempt can be made to correct the problem during the time period provided for in the technical specifications, or the operator can initiate a manual shutdown.

Finally, in the unlikely event that Ttr would be increasing while all primary and DNMS-loop signals indicate nominal readings, then this would be an indication of a possible formation of an assembly flow blockage. The reactor would then be scrammed.

In the preferred embodiment of the present invention, an interactive terminal 62 is interfaced with display monitor 48 and judgmental knowledge base 10. The reactor operator is then provided with an interactive capability to manually query the status of any component of the system for operability validation. Thus, in this embodiment of the present invention, the system may be operated in a passive surveillance mode.

Use of the present invention will reduce complexity and mitigate confusion in the reactor control room 50. It will minimize the possibility of human error or oversight, by providing automatic annunciation of discrepant signals or the incipiences of initiating faults. It also provides the reactor operator with a passive surveillance mode. This combination of automatic and manual systems reduces challenges to plant availability while allowing incorporation of the role of the operator in a manner of which most effectively augments the achievement of overall plant operability goals.

In summary, diagnostic information made available from the present invention will be processed, compared against derived information from independent physical sensors, and presented to the reactor operator with the aid of the artificial intelligence-based surveillance and diagnosis system of the present invention. This apparatus, will be multiplexed to output devices in the reactor control room 50, will provide the operator with rapid identification (as much as ten minutes in advance of signals from the cover-gas monitoring system) of conditions that could lead to plant operational degradation, enabling him or her to terminate or avoid events which might challenge safety or radiological performance guidelines.

The foregoing description of the preferred embodiments of the invention have been presented for purposes of illustration and description. They are not intended to be exhaustive or to limit the invention to the precise forms disclosed, and obviously many modifications and variations are possible in light of the above teachings. The embodiments were choosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto.

The embodiment of the invention in which an exclusive property or privilege is claimed is defined as follows:

1. In a nuclear reactor having a core comprised of a plurality of cladded fuel elements, a coolant having a primary flow through the core over said cladded fuel elements, said fuel elements including fissionable fuel which emits delayed-neutrons (DN) as part of a nuclear chain reaction, a breached fuel element diagnostic apparatus comprising:

monitoring means for measuring the coolant primary flow rate and reactor power and generating output signals in response thereto;

delayed-neutron monitoring system (DNMS) means for measuring the equivalent recoil area (ERA) of a breach in the cladding of said fuel elements and for continuously monitoring the DN age and DN activity and generating output signals in response thereto, said DN age comprising the sum of a transit time, $T_{tr}$, and hold-up time, $T_h$;

operability validation means for testing the operability of the components of said DNMS means and generating output signals indicating the operability of said components; and a knowledge system comprising a factual knowledge base, a judgment knowledge base and means for said judgmental knowledge base to access said factual knowledge base, said judgmental knowledge base receiving, as input signals, the output signals from said monitoring means, DNMS means and operability validation means, said judgmental knowledge base comprising means for determining the operability of said reactor from a predetermined combination of judgmental knowledge base input signals, said predetermined combination accounting for a nonconstant DN age, and generating output signals in response thereto.

2. The apparatus of claim 1 wherein said judgmental knowledge base output signals indicate whether said reactor should continue to operate, be manually shut down, be scrammed, or whether an alarm status should be set and further comprising display means, responsive to said knowledge system output signal, for translating said signals into conventional human readable form.

3. The apparatus of claim 2 further comprising at least one audible alarm responsive to said knowledge system output signals, said alarm indicating the occurence of predetermined reactor conditions.

4. The apparatus of claim 3 wherein said DNMS is a multiple detector DN monitoring loop comprising:

a loop flow circuit;

a pump for conveying coolant flow from said core through said loop flow circuit and back to said core;

at least three separate DN activity detectors proximate to said loop flow circuit; and ERA evaluating means responsive to said DN activity detectors for generating output signals indicating the ERA of a breached fuel element and the DN age.

5. The apparatus of claim 4 wherein said operability validation means comprises:

pump testing means for testing the operability of said pump;

loop flow measuring means for measuring the flow through said loop flow circuit;

thermocouple means for measuring the temperature of the coolant in said monitoring loop; and means for testing the operability of said DN activity detectors.

6. The apparatus of claim 5 wherein said pump is an electromagnetically driven pump and wherein said pump testing means comprises:

voltage measuring means for measuring the pump voltage; and current measuring means for measuring the pump current.

7. The apparatus of claim 6 further comprising interactive terminal means communicating with said knowledge system for allowing a human operator to query the status of components of said reactor for operability validation.

8. The apparatus of claim 6 wherein said judgmental knowledge base generates an output signal indicating:

(a) an alarm status in response to input signals indicating: (i) decreasing DN activity and stationary DN age and nondecreasing reactor power, or (ii) decreasing DN activity and increasing DN age and nonincreasing $T_h$ and nonconsistant primary flow rate;

(b) said reactor should be scrammed in response to input signals indicating: (i) decreasing DN activity and nonincreasing $T_h$ and no malfunction in the DNMS;

(c) said reactor should be manually shut down in response to input signals indicating; (i) increasing DN activity and stationary DN age and nonincreasing reactor power and the ERA is above a predetermined limit, or (ii) increasing DN activity and decreasing DN age and the ERA is above a predetermined limit, or (iii) decreasing DN activity and increasing DN age and increasing $T_h$ and the ERA is above a predetermined limit, or (iv) decreasing DN activity and increasing DN age and nonincreasing $T_h$ and nonconsistent primary flow rate and a malfunction in said DNMS;

(d) said reactor should continue to operate in response to input signals indicating: (i) stationary DN activity, or (ii) increasing DN activity and stationary DN age and increasing reactor power, or (iii) increasing DN activity and stationary DN age and nonincreasing reactor power and the ERA is below a predetermined limit, or (iv) increasing DN activity and decreasing DN age and the ERA is below a predetermined limit, or (v) decreasing DN activity and increasing DN age and increasing $T_h$, and the ERA is below a predetermined limit, or (vi) decreasing DN activity and increasing DN age and nonincreasing $T_h$ and consistently changing primary flow rate, or (vii) decreasing DN activity and stationary DN age and decreasing reactor power.

9. In a nuclear reactor having a core comprised of a plurality of cladded fuel elements, a coolant having a primary flow over said cladded fuel elements said elements including fissionable fuel which emits delayed neutrons (DN) as part of a nuclear chain reaction a method of diagnosing the status of said reactor, when said reactor has a breached fuel element, comprising the steps of:

monitoring changes in DN activity with DN activity detecting means and generating an output signal in response thereto;

continuously monitoring changes in the, age of DN with DN age monitoring means and generating an output signal in response thereto, said DN age comprising the sum of a transit time, $T_{tr}$, and a hold up time $T_h$;

measuring the equivalent recoil area (ERA) of a breach in the cladding of said fuel elements with ERA measuring mean and generating an output signal in response thereto;

testing the operability of said DN activity monitoring means, said DN age monitoring means and said ERA measuring means with operability validation means and generating output signals indicating the operability thereof;

measuring the power of said reactor and generating an output signal in response thereto;

measuring the primary coolant flow rate and generating an output signal in response thereto;

determining and indicating the status of said reactor including whether said reactor should be scrammed, manually shut down, continue to operate or whether an alarm status should be set from predetermined combinations of output signals, said predetermined combination accounting for a nonconstant DN age.

10. The method of claim 9 wherein said DN activity detecting means, said DN age monitoring means and said ERA measuring means define a multiple detector DN monitoring loop comprising a loop flow circuit; a pump for conveying coolant flow from said core through said loop flow circuit and back to said core; at least three separate DN activity detectors proximate to said loop flow circuit; and ERA evaluating means responsive to said DN activity detectors for generating output signals indicating the ERA of a breached fuel element and the DN age wherein the step of testing the operability of said DN activity monitoring means, and said ERA measuring means comprises:

determining the operability of said pump;

measuring the coolant flow in said loop flow circuit;

measuring the temperature of the coolant in said loop flow circuit; and testing the operability of said DN activity detectors.

11. The method of claim 10 wherein said pump is an electromagnetically driven pump and wherein the step of determining the operability of said pump comprises:

measuring the voltage of said pump; and measuring the current of said pump.

12. The method of claim 11 wherein the step of determining and indicating the status of said reactor comprises:

indicating an alarm status in response to output signals indicating: (i) decreasing DN activity and stationary DN age and nondecreasing reactor power, or (ii) decreasing DN activity and increasing DN age and nonincreasing $T_h$ and nonconsistent primary flow rate;

indicating said reactor should be scrammed in response to output signals indicating: (i) decreasing DN activity and nonincreasing $T_h$ and nonmalfunction in said multiple detector DN monitoring loop;

indicating said reactor should be manually shut down in response to output signals indicating: (i) increasing DN activity and stationary DN age and nonincreasing reactor power and the ERA is above a predetermined value, or (ii) increasing DN activity and decreasing DN age and the ERA is above a predetermined limit, or (iii) decreasing DN activity and increasing DN age and increasing $T_h$ and the ERA is above a predetermined limit, or (iv) decreasing DN activity and increasing DN age and nonincreasing $T_h$ and nonconsistent primary flow rate and a malfunction in said multiple detector DN monitoring loop;

indicating said reactor should continue to operate in response to output signals indicating: (i) stationary DN activity, or (ii) increasing DN activity and stationary DN age and increasing reactor power, or (iii) increasing DN activity and stationary DN age and nonincreasing reactor power and the ERA is below a predetermined limit, or (iv) increasing DN activity and decreasing DN age and the ERA is below a predetermined limit, or (v) decreasing DN activty and increasing DN age and increasing $T_h$ and the ERA is below a predetermined limit, or (vi) decreasing DN activity and increasing DN age and nonincreasing $T_h$ and consistently changing primary flow rate, or (viii) decreasing DN activity and stationary DN age and decreasing reactor power.

13. The method of claim 12 further comprising displaying said reactor status in human readable form.

14. The method of claim 13 further comprising sounding audible alarms indicating predetermined reactor conditions.

15. The method of claim 14 further comprising the step of communicating with said knowledge system to query the status of components of said reactor.

* * * * *